US010980181B2

(12) United States Patent
Sudbrack et al.

(10) Patent No.: US 10,980,181 B2
(45) Date of Patent: Apr. 20, 2021

(54) LATERAL TRANSPORT ASSEMBLY FOR AN AGRICULTURAL HEADER

(71) Applicant: CNH Industrial America LLC, New Holland, PA (US)

(72) Inventors: Cecil R. Sudbrack, New Holland, PA (US); Todd F. Hertzler, East Earl, PA (US)

(73) Assignee: CNH Industrial America LLC, New Holland, PA (US)

( * ) Notice: Subject to any disclaimer, the term of this patent is extended or adjusted under 35 U.S.C. 154(b) by 222 days.

(21) Appl. No.: 16/163,957

(22) Filed: Oct. 18, 2018

(65) Prior Publication Data
US 2020/0120873 A1  Apr. 23, 2020

(51) Int. Cl.
*A01B 73/00* (2006.01)
*A01D 75/00* (2006.01)
*B60P 3/06* (2006.01)

(52) U.S. Cl.
CPC .......... *A01D 75/002* (2013.01); *A01B 73/005* (2013.01); *B60P 3/066* (2013.01)

(58) Field of Classification Search
CPC ...... A01D 75/002; A01D 47/00; A01D 67/00; A01D 80/005; A01D 89/004; A01B 15/14; A01B 23/02; A01B 73/00; A01B 73/005; B60P 3/066; B60P 3/40; B60P 1/64–649
See application file for complete search history.

(56) References Cited

U.S. PATENT DOCUMENTS

| 3,245,695 A | | 4/1966 | Bernard | |
|---|---|---|---|---|
| 3,683,605 A | * | 8/1972 | Jakobi | A01D 75/002 56/228 |
| 3,763,637 A | * | 10/1973 | Schmitt | A01D 75/002 56/228 |
| 3,910,436 A | * | 10/1975 | MacHan | B62D 63/06 414/495 |
| 3,919,831 A | * | 11/1975 | Halls | A01D 67/005 56/228 |

(Continued)

FOREIGN PATENT DOCUMENTS

| DE | 2132135 A1 | * | 2/1972 | .......... A01D 75/002 |
|---|---|---|---|---|
| EP | 1 618 779 A1 | | 1/2006 | |

OTHER PUBLICATIONS

Extended European Search Report for EP Application No. 19203997.2 dated Mar. 10, 2020 (five pages).

*Primary Examiner* — Adam J Behrens
(74) *Attorney, Agent, or Firm* — Peter Zacharias; Patrick Sheldrake

(57) ABSTRACT

A header for an agricultural vehicle including a frame having lateral ends and a transport assembly connected to the frame and configured for being positioned in a transport position and a storage position. The transport assembly includes a tandem axle support device including at least one pivot shaft pivotally connected to the frame, a first walking beam, and a second walking beam. The first and second walking beams are operably connected to and moveable by the at least one pivot shaft. The transport assembly also includes at least four wheels including a first pair of tandem wheels removably connected to the first walking beam and a second pair of tandem wheels removably connected to the second walking beam.

17 Claims, 5 Drawing Sheets

(56) References Cited

U.S. PATENT DOCUMENTS

| | | | | |
|---|---|---|---|---|
| 4,385,483 A | * | 5/1983 | McIlwain | A01D 75/002 56/15.2 |
| 4,444,000 A | * | 4/1984 | Enzmann | A01D 41/16 56/14.6 |
| 4,662,162 A | | 5/1987 | Bettencourt et al. | |
| 5,243,810 A | * | 9/1993 | Fox | A01B 73/005 56/14.4 |
| 5,374,082 A | | 12/1994 | Smith | |
| 5,975,829 A | * | 11/1999 | Walters | A01B 73/005 14/71.1 |
| 6,209,297 B1 | * | 4/2001 | Yeomans | A01B 73/005 56/14.9 |
| 7,197,865 B1 | * | 4/2007 | Enns | A01B 73/005 56/228 |
| 7,275,753 B1 | * | 10/2007 | Ceccarelli | B60P 3/127 280/43.21 |
| 7,552,579 B2 | * | 6/2009 | Tippery | A01B 73/005 280/641 |
| 7,926,249 B1 | * | 4/2011 | Cook | A01D 75/002 56/228 |
| 8,025,312 B1 | * | 9/2011 | Honas | A01D 75/002 280/769 |
| 8,117,812 B2 | | 2/2012 | Patterson | |
| 10,405,481 B2 | * | 9/2019 | Chen | A01D 75/002 |
| 2008/0086999 A1 | * | 4/2008 | Tippery | A01B 73/005 56/228 |
| 2012/0011822 A1 | * | 1/2012 | Honas | A01D 75/002 56/228 |
| 2015/0181809 A1 | | 7/2015 | Honey | |
| 2017/0050691 A1 | * | 2/2017 | Guerin | A01B 51/04 |
| 2020/0055545 A1 | * | 2/2020 | Chen | A01D 34/30 |

* cited by examiner

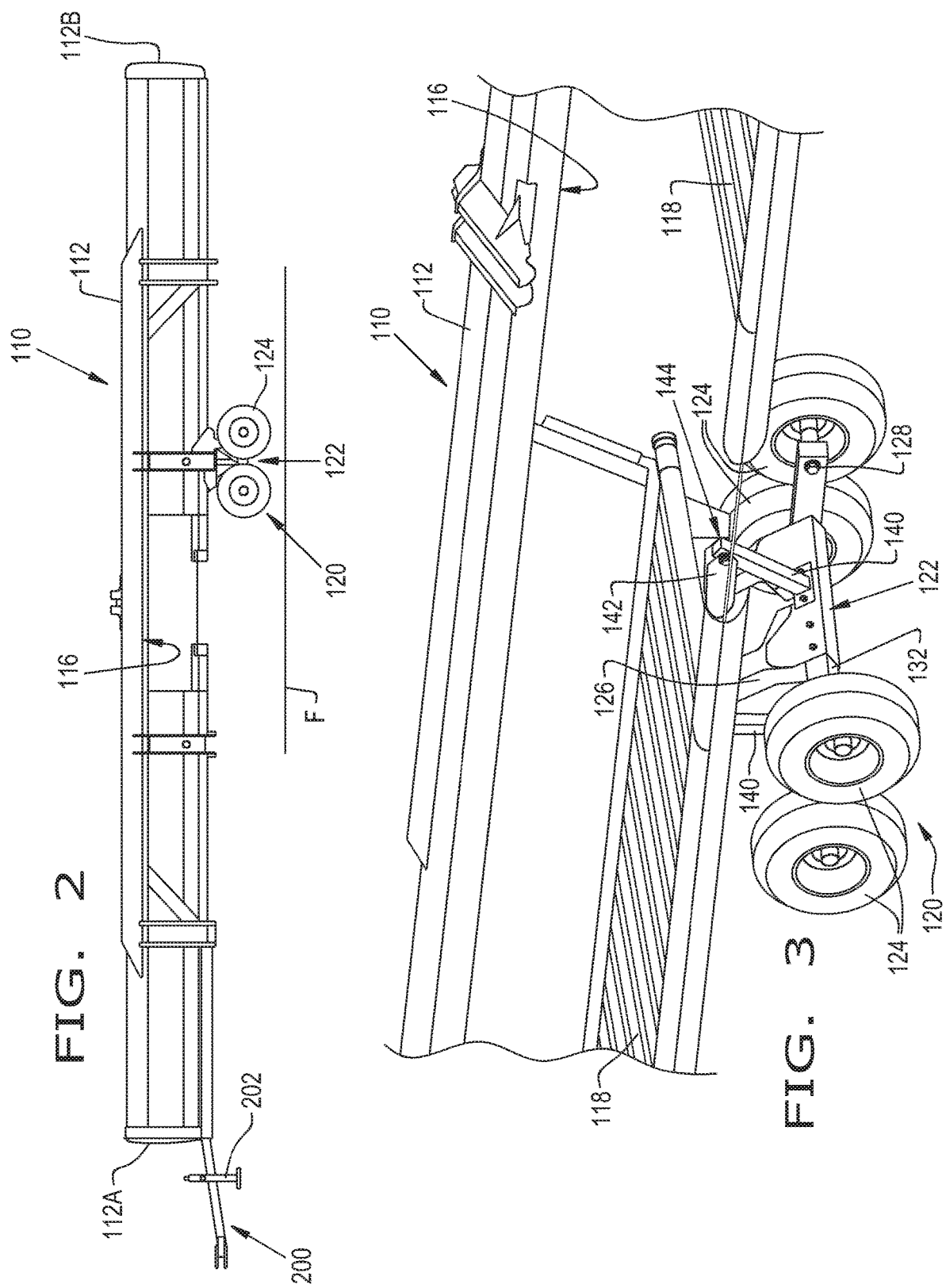

LATERAL TRANSPORT ASSEMBLY FOR AN AGRICULTURAL HEADER

FIELD OF THE INVENTION

The present invention pertains to agricultural headers and, more specifically, to a transport assembly for an agricultural header.

BACKGROUND OF THE INVENTION

An agricultural harvester known as a "combine" is historically termed such because it combines multiple harvesting functions, such as picking, threshing, separating, and cleaning, in a single harvesting unit. Generally, a combine includes a chassis, a prime mover, a feeder housing, a header removably attached to the feeder housing for removing the crop from a field, a threshing system, and a cleaning system. The threshing system may include an axially displaced threshing rotor and a perforated rotor housing, which can be composed of adjustable concaves. The threshing rotor is provided with rasp bars that interact with the crop material, and as the threshing rotor rotates within the rotor housing the threshing rotor performs a threshing operation on the crop material to remove the grain and provides positive crop movement. Once the grain is threshed, the grain falls through the perforations in the rotor housing and is subsequently cleaned by the cleaning system. The cleaning system includes a cleaning fan which blows air through oscillating sieves to discharge chaff and other debris toward the rear of the combine. Non-grain crop material or material other than grain (MOG), such as straw, from the threshing and cleaning systems proceeds through a straw chopper and out the rear of the combine. Clean grain is transported, by a clean grain auger, to a grain tank onboard the combine.

A typical header generally includes a frame, a pair of end dividers at the lateral ends of the frame, a cutter to remove crop material from the field, and a conveyor to transport the cut crop material to the feeder housing for further downstream processing in the combine. Generally, these features of a header are specifically optimized to harvest a particular kind of crop material. For instance, the header may be in the form of a draper header which has a cutter bar, a draper belt, and a rotating reel with tines or the like in order to harvest a bushy or fluffy crop material, such as soy beans or canola. Alternatively, the header may be in the form of a corn header which includes an auger and row units with snouts, gathering chains, and stalk rolls in order to harvest corn.

Transporting modern headers from one harvesting location to another may be arduous. Given the increased capacity, size, and weight of modern headers, modern headers generally must be detached from the combine and transported lengthwise to conform to relatively narrow roadways. To transport a header, a separate transport trailer can be used to support the header or the header itself may additionally include a transport assembly attached to the header frame. As can be appreciated, the header transport trailer can be suboptimal as an operator must purchase and maintain an additional piece of equipment in addition to the header. On the other hand, a transport assembly can be advantageous as it is integrated into the header frame.

A typical transport assembly includes an attachment device, such as a tongue, at one end of the header and a pair of pivoting or removable wheels positioned adjacent to the other end of the header. Pivoting wheels are generally permanently attached to the header and move between a transport position, in which the wheels are located underneath the header, and a harvesting position, in which the wheels are tucked behind the rear of the header frame. For example, an actuator, such as a motor, may pivot an arm which in turn mounts the wheels. In such a configuration, a header may remain attached to the combine as the wheels pivot between the transport and harvesting positions. However, if there is insufficient ground clearance, the arm may not have enough operational clearance to transition the tires between the two operating positions. Further, if the wheels undesirably contact the ground during a transitional period, the wheels, swing arm, actuator, and/or other structural members of the header may become damaged. Removable wheels can be detached from an axle mount of the header transport assembly for harvesting the crop material and can be reattached to the axle mount for transportation. In the detachable wheel configuration, an operator may need to manually detach the wheels from the header. Hence, removable wheels may not be desired as some wheels may be cumbersome and time-consuming to remove and reattach.

What is needed in the art is a cost-effective and easy-to-operate transport assembly.

SUMMARY OF THE INVENTION

In one exemplary embodiment formed in accordance with the present invention, there is provided a transport assembly that is integral with the header and positionable in a transport position and a storage position. The transport assembly includes a tandem axle support device and four wheels that are connected in tandem to the axle support device. The tandem axle support device includes at least one pivot shaft and a pair of walking beams which mount the tandem wheels. The at least one pivot shaft folds and unfolds in order to position the walking beams in the transport position and the storage position.

In another exemplary embodiment formed in accordance with the present invention, there is provided a header for an agricultural vehicle including a frame having lateral ends and a transport assembly connected to the frame and configured for being positioned in a transport position and a storage position. The transport assembly includes a tandem axle support device including at least one pivot shaft pivotally connected to the frame, a first walking beam, and a second walking beam. The first and second walking beams are operably connected to and moveable by the at least one pivot shaft. The transport assembly also includes at least four wheels including a first pair of tandem wheels removably connected to the first walking beam and a second pair of tandem wheels removably connected to the second walking beam.

In yet another exemplary embodiment formed in accordance with the present invention, there is provided an agricultural vehicle, including a chassis, at least one connecting member, and a header. The header includes a frame removably attached to the at least one connecting member and a transport assembly connected to the frame. The transport assembly is configured for being positioned in a transport position and a storage position. The transport assembly includes a tandem axle support device including at least one pivot shaft pivotally connected to the frame, a first walking beam, and a second walking beam. The first and second walking beams are operably connected to and moveable by the at least one pivot shaft. The transport assembly also includes at least four wheels including a first pair of tandem wheels removably connected to the first walking beam and a second pair of tandem wheels removably connected to the second walking beam.

In yet another exemplary embodiment formed in accordance with the present invention, there is provided a method for transporting agricultural equipment. The method includes providing a header including a frame and a transport assembly connected to the frame and configured for being positioned in a transport position and a storage position. The transport assembly includes a tandem axle support device including at least one pivot shaft pivotally connected to the frame, a first walking beam, and a second walking beam. The first and second walking beams are operably connected to and moveable by the at least one pivot shaft. The transport assembly also includes at least four wheels including a first pair of tandem wheels removably connected to the first walking beam and a second pair of tandem wheels removably connected to the second walking beam. The method also includes the steps of positioning the transport assembly into the transport position to transport the header from one field to another field, and positioning the transport assembly into the storage position to harvest a crop material with the header.

One possible advantage of the exemplary embodiment of the header transport assembly is that the tandem axle support device allows for a higher load carrying capacity without increasing the header height required for removing the header from the agricultural vehicle by using smaller tires in a tandem configuration.

Another possible advantage of the exemplary embodiment of the header transport assembly is that the tandem axle support device is closer to the middle of the header, which in turn reduces the weight of the header acting on the tongue during transportation of the header.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown Like numerals indicate like elements throughout the drawings. In the drawings:

FIG. 2 illustrates a side view of the header of FIG. 1;

FIG. 3 illustrates a front perspective view of the transport assembly of FIGS. 1-2;

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings".

Figure 1:
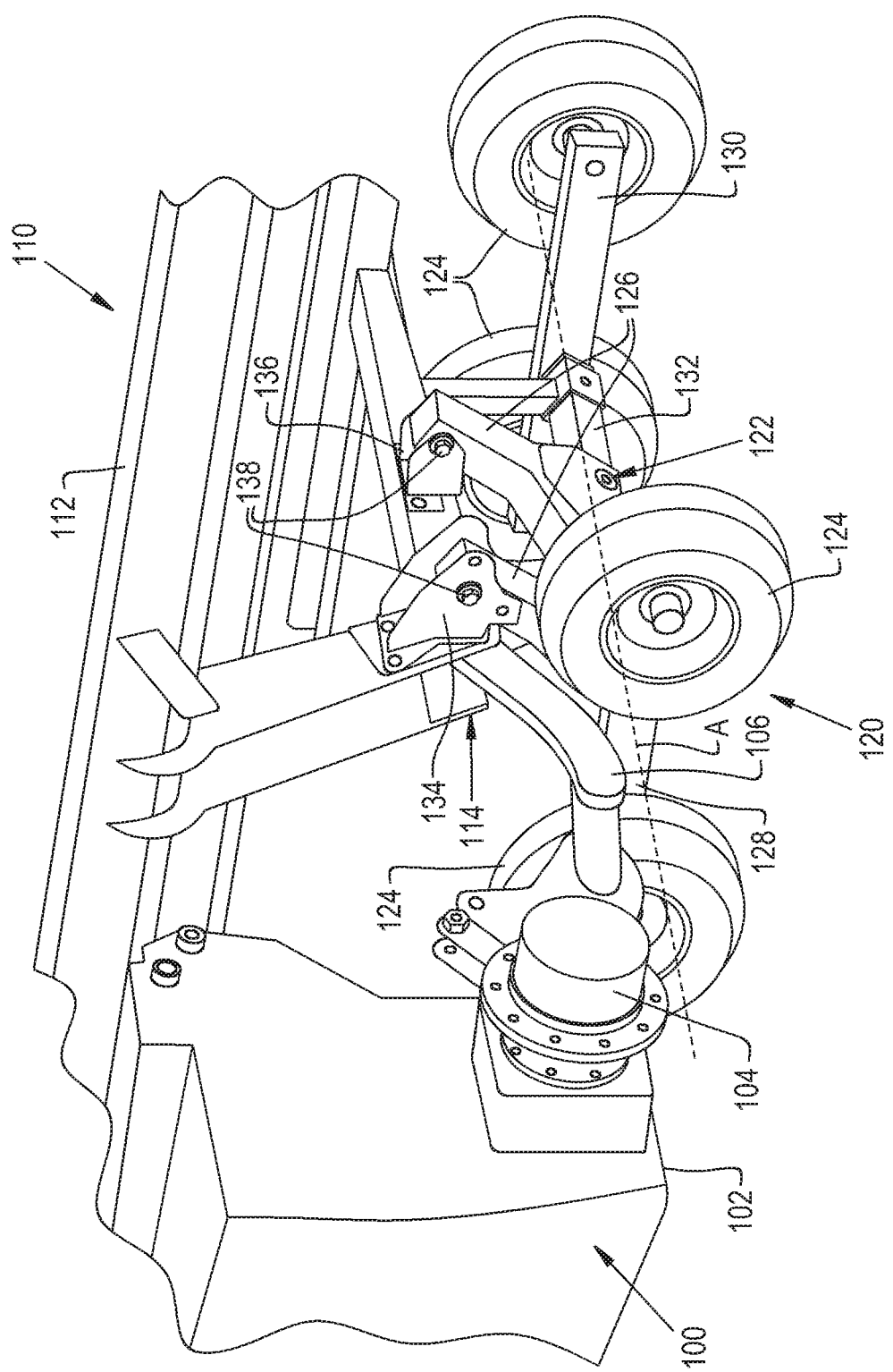
FIG. 1 illustrates a perspective view of an exemplary embodiment of an agricultural vehicle including a header with a transport assembly having a transport position and a storage position, in accordance with an exemplary embodiment of the present invention.

Referring now to the drawings, and more particularly to FIGS. 1-5, there is shown an agricultural vehicle 100 including a chassis 102, a wheel axle 104, at least one connecting member 106, such as a feeder housing or one or more lift arms, and a header 110. The agricultural vehicle 100 can be in the form of any desired agricultural vehicle 100, such as an agricultural combine or a self-propelled windrower. Thereby, if the agricultural vehicle 100 is in the form of a combine, then the connecting member 106 may be in the form of the feeder housing, and if the agricultural vehicle 100 is in the form of a self-propelled windrower, then the connecting member 106 may be in the form of one or more lift arms 106 (FIG. 1).

In the exemplary embodiment shown, the header 110 is in the form of a draper header 110, which may harvest bushy or fluffy crop material. However, the header 110 may be in the form of any desired header 110, such as a corn header. The header 110 generally includes a frame 112 and a transport assembly 120. The header 110 may further include one or more flexible cutter bars with reciprocating knives to cut the crop material, a draper belt 118 and/or auger for conveying the cut crop material into a feeder housing of the agricultural vehicle 100, and a rotating reel with tines or the like to sweep the cut crop material inwardly.

The frame 112 of the header 110 can be removably attached to the at least one connecting member 106 of the agricultural vehicle 100 (FIG. 1). The frame 112 has lateral ends 112A, 112B and at least one lift pocket 114 (FIGS. 1-2). The agricultural vehicle 100 can include two lift arms 106, and thereby the frame 112 can include two corresponding lift pockets 114 to receive the lift arms 106. The frame 112 may also include an opening 116, which is positioned approximately at the center of the frame 112, to accommodate the feeder housing of the agricultural vehicle 100.

Figure 4:
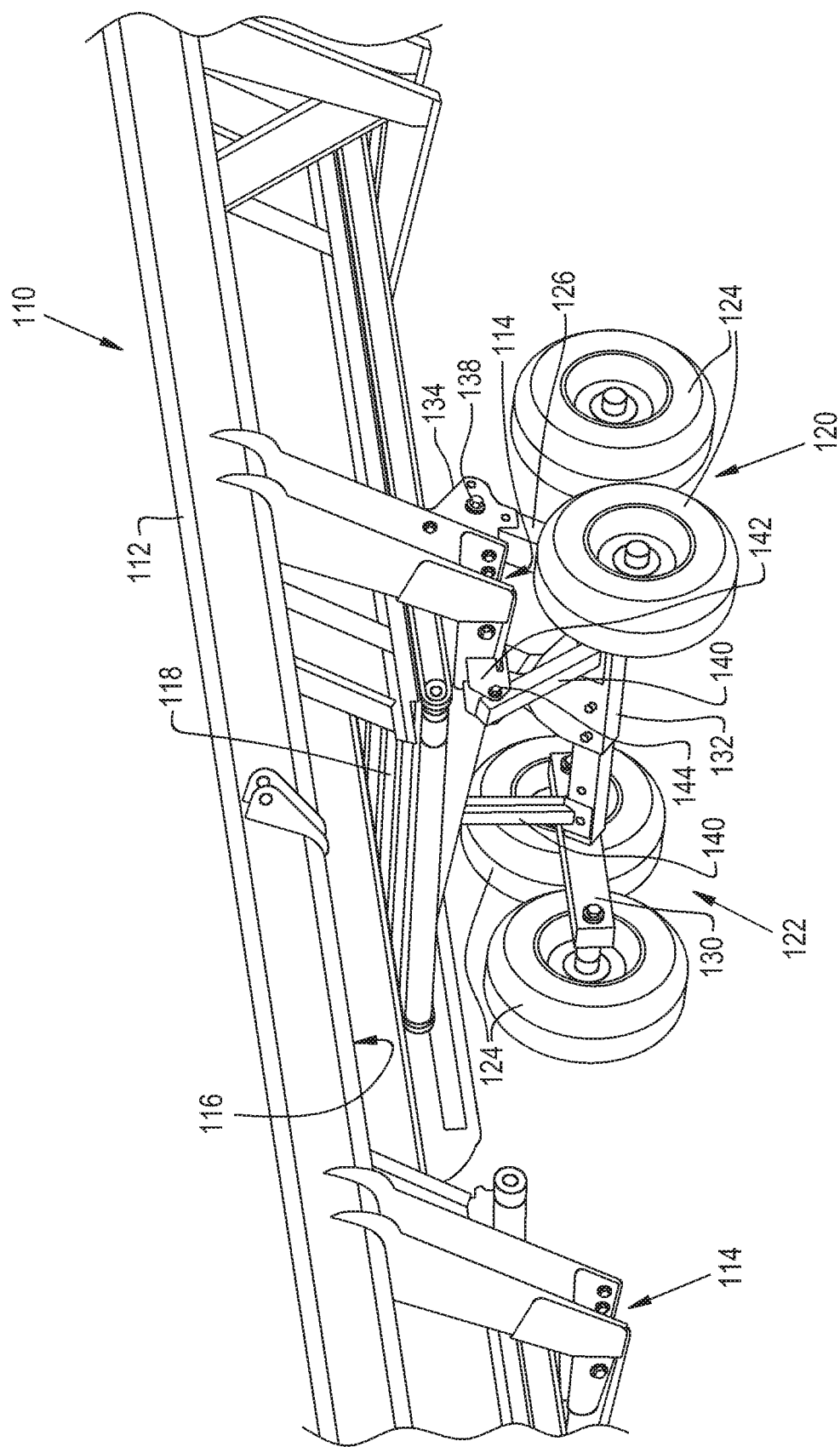
FIG. 4 illustrates a rear perspective view of the transport assembly of FIGS. 1-3 in the transport position.
Figure 5:
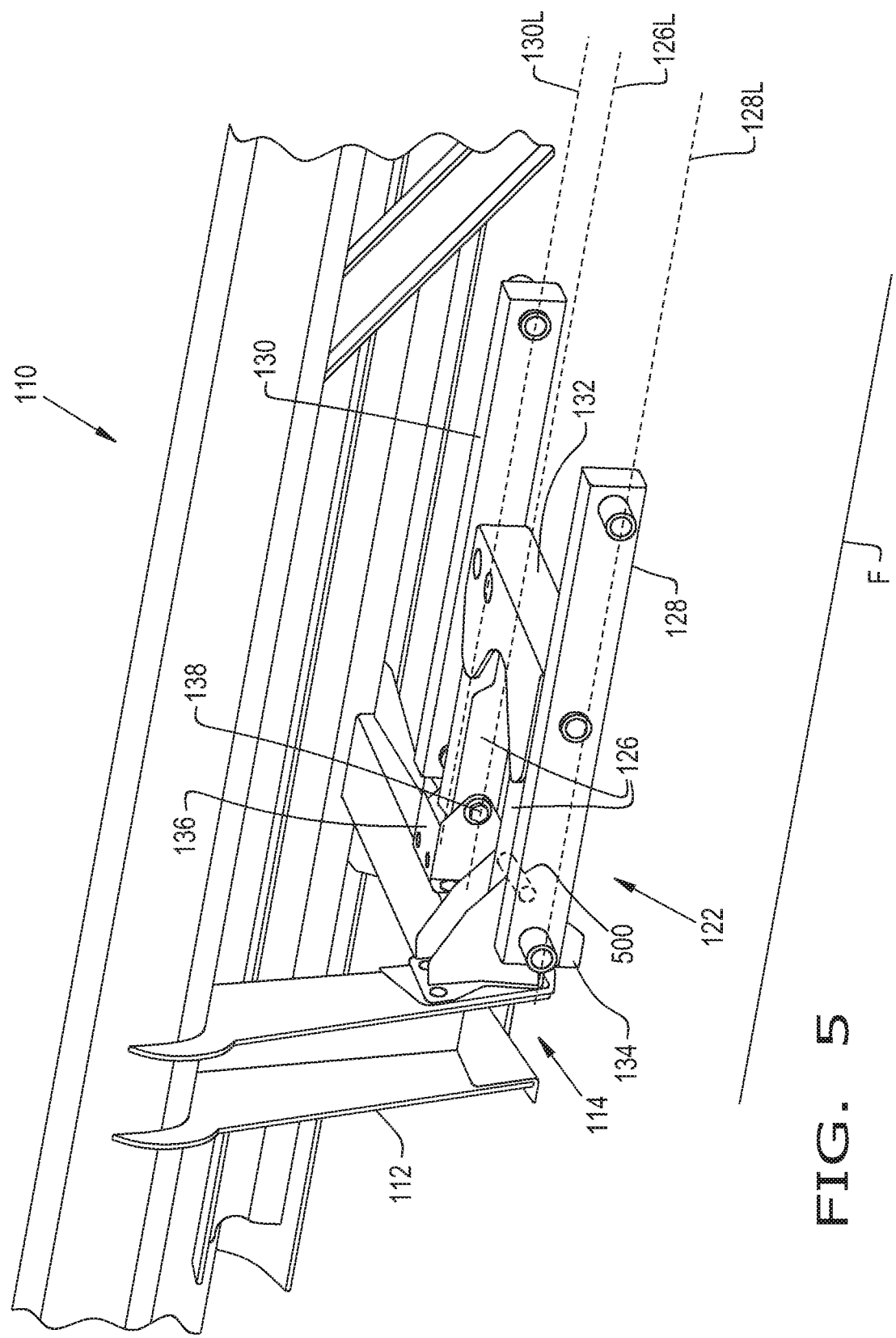
FIG. 5 illustrates a rear perspective view of the transport assembly of FIG. 1 in the storage position, in accordance with an exemplary embodiment of the present invention.

The transport assembly 120 generally includes a tandem axle support device 122 and at least two sets of tandem wheels 124. The transport assembly 120 is connected to the frame 112 and can be positioned in a transport position (FIGS. 1-4) and a storage or field-working position (FIG. 5). For instance, the operator of the header 110 may manually adjust the transport assembly 120 to switch the transport assembly 120 between the transport position and storage position, and vice versa. In the transport position, the tandem axle support device 122 is pivoted downwardly, away from the frame 112, so that an axis A of the tandem axle support device 122 may be approximately coplanar, plus or minus 10 inches, with the lift pocket 114, and the wheels 124 are attached to the tandem axle support device 122 (FIG. 1). In the storage position, the tandem axle support device 122 is pivoted upwardly, toward the frame 112, and may rest substantially parallel with a field F, and the wheels 124 are disconnected from the tandem axle support device 122 (FIG. 5).

The tandem axle support device 122 generally includes at least one pivot shaft 126, such as a pair of pivot shafts 126, a first walking beam 128, a second walking beam 130, and a transverse shaft 132. The pivot shaft(s) 126 and the transverse shaft 132 may form a pivot hub which supports and moves the walking beams 128, 130. The tandem axle support device 122 can be positioned next to one of the lift pockets 114. For example, one of the lift pockets 114 of the frame 112 can be located in between a first set of tandem wheels 124 (FIGS. 1 and 4). In other words, the axis A of the tandem axle support device 122 may be approximately coplanar with the lift pocket 114.

The pivot shaft(s) 126 may be pivotally connected to the frame 112 and fixedly attached to the transverse shaft 132. The at least one pivot shaft 126 defines a longitudinal axis 126L (FIG. 5). In some embodiments, the tandem axle support device 122 has two pivot shafts 126. Each pivot shaft 126 can be pivotally connected to the frame 112 by a respective bracket 134, 136 and a fastener 138, such as a pin 138. For instance, the brackets 134, 136 can be mounted underneath the header 110 at a portion of the frame 112 which allows the pivot shafts 126 to freely rotate about the fastener 138, relative to the frame 112. Each pivot shaft 126 may be fixedly attached to the transverse shaft 132 by a clamp, bracket, and/or fasteners. The pivot shafts 126 may be pivoted to be substantially vertical, plus or minus 20 degrees from a vertical axis, in the transport position. The pivot shafts 126 may be pivoted to be substantially horizontal, plus or minus 20 degrees from a horizontal axis, in the storage position. Additionally, the pivot shafts 126 may be substantially parallel to the field F and/or underside of the header 110 in the storage position. Each pivot shaft 126 can have any desired shape and may comprise any desired material.

The walking beams 128, 130 can be operably connected to and moveable by the at least one pivot shaft 126 by way of the transverse shaft 132. The walking beams 128, 130 can be pivotally connected to the transverse shaft 132. Each walking beam 128, 130 defines a longitudinal axis 128L, 130L (FIG. 5). In the transport position, the pivot shaft(s) 126 may be unfolded such that the walking beams 128, 130 are lowered to a position underneath the header 110 so that the wheels 124 contact the field F. In the storage position, the pivot shaft(s) 126 may be folded such that the longitudinal axes 128L, 130L of the walking beams 128, 130 are coplanar with the longitudinal axis 126L of the pivot shaft(s) 126. The walking beams 128, 130 can be in the form of any desired walking beams. The walking beams 128, 130 may have any desired shape and size in order to mount the wheels 124 in a desired tandem configuration.

The transverse shaft 132 can be connected to the pivot shaft(s) 126 and the walking beams 128, 130. The middle portion of the transverse shaft 132 can be fixedly attached to the pivot shaft(s) 126. Each end of the transverse shaft 132 may pivotally mount a respective walking beam 128, 130. The transverse shaft 132 defines the pivot axis A of the tandem axle support device 122 such that the walking beams 128, 130 may pivot relative to the transverse shaft 132 (FIG. 1). The transverse shaft 132 can be substantially perpendicular to the walking beams 128, 130. The transverse shaft 132 may be in the form of a telescoping transverse shaft 132 which is made of a middle portion connected to the pivot shaft(s) 126 and telescoping end members, which are connected to the walking beams 128, 130. Thereby, in the transport position, the telescoping transverse shaft 132 is extended. In the storage position, the telescoping transverse shaft 132 is retracted, which correspondingly reduces the overall profile of the tandem axle support device 122 in the storage position. However, it is conceivable that the transverse shaft 132 may not telescope and may instead be in the form of a single shaft. It is also conceivable that the transverse shaft 132 may be in the form of multiple shafts, in a parallel or crossed configuration. The transverse shaft 132 can have any desired shape and may comprise any desired material.

The transport assembly 120 can include at least four wheels 124, such as a first and second pair of tandem wheels 124, which are connected to the walking beams 128, 130 and disposed in a tandem configuration. Hence, two wheels 124 may be connected in tandem to one walking beam 128, and the other two wheels 124 may be connected in tandem to the other walking beam 130. In the transport position, the wheels 124 are each connected to a respective walking beam 128, 130. In the storage position, the wheels 124 are disconnected from the walking beams 128, 130.

Additionally, after the wheels 124 are disconnected from the walking beams 128, 130, at least two of the wheels 124 may be connected adjacent to the lateral ends 112A, 112B of the frame 112 of the header 110 to serve as gauge wheels in the storage position and during operation of the header 110. For instance, in the storage position, at least one of the first pair of tandem wheels 124 can be connected to one lateral end 112A of the frame 112 and at least one of the second pair of tandem wheels 124 can be connected to the other lateral end 112B of the frame 112 so that these two wheels 124 may contact the field F and at least partially support the header 110. Furthermore, all four of the wheels 124 can be used as gauge wheels on the header 110 in the storage position. The wheels 124 can be in the form of any desired wheels 124. For example, the wheels 124 can be in the form of four small wheels 124. The four small wheels 124 can be smaller than the wheels which are used on a conventional transport assembly.

Modern headers may be rather heavy due to the inclusion of additional equipment, such as cross augers, end shears, more durable reels, etc., and thereby the conventional transport assembly may require larger transport wheels with a greater weight capacity. For instance, each larger wheel may be an 11 L×14 wheel, which has a diameter of 30 inches, or more, and a width of 10.7 inches, with a load capacity of 2,150 lbs. Such larger transport wheels can be more difficult and time-consuming for an operator to detach and reattach to a given header. It is noted that the four smaller wheels 124 of the transport assembly 120 may meet the weight requirement of modern headers. For instance, each small wheel may be a 20.5×8×10 (205/65-10) wheel, which has a diameter of 20.5 inches, and a width of 8 inches, with a load capacity of 1,670 lbs. Additionally, the smaller wheels 124, in comparison to the two larger wheels of a given conventional transport assembly, reduce the maximum header height requirement for removing the wheels 124 in transitioning the transport assembly 120 into the storage position. It is also noted that the four smaller wheels 124 allow the tandem axle support device 122 to be closer to the center of the header 110, which in turn reduces the weight of the header 110 acting on the tongue 200 in the transport position. In other words, the axle hub, i.e., the pivot shaft(s) 126 and the transverse shaft 132, can be positioned in line with the lift pocket 114 of the frame 112 because of the smaller wheel diameter and tandem configuration of the wheels 124.

In some exemplary embodiments of the agricultural vehicle 100, the tandem axle support device 122 may further include one or more truss member(s) 140. Each truss member 140 may be removably interconnected between the frame 112 and the transverse shaft 132 and/or pivot shaft(s) 126. For example, a pair of truss members 140 can be connected to the frame 112, via a corresponding bracket 142 and a fastener 144, such as a pin 144, and to the transverse shaft 132, via one or more fasteners (unnumbered). Furthermore, the truss members 140 can be coupled with the frame 112 and the transverse shaft 132 in the transport position, thereby providing additional support for the wheels 124, and the truss members 140 can be removed from the tandem axle support device 122 in the storage position. It should be appreciated that the truss members 140 can be stored in a corresponding storage location on the header 110 in the storage position.

In some exemplary embodiments of the agricultural vehicle 100, the tandem axle support device 122 may further include one or more locking feature(s) 500 in order to lock the components of the tandem axle support device 122 in the transport position and/or storage position (FIG. 5). For example, the tandem axle support device 122 may include fasteners for locking the pivot shaft(s) 126 to a respective bracket 134, 136 in the transport position (not shown). Additionally, for example, the tandem axle support device 122 may include at least one pin 500 to cross pin the walking beams 128, 130 to the frame 112, the pivot shaft(s) 126, and/or the transverse shaft 132 in the storage position. For instance, the pin 500 may extend through corresponding holes in the bracket 134 and pivot shaft 126 to lock the tandem axle support device 122 in the storage position (FIG. 5). Thus, in the storage position, the walking beams 128, 130 can be locked in a position which is coplanar with the pivot shaft(s) 126 and parallel to the field F.

Figure 6:
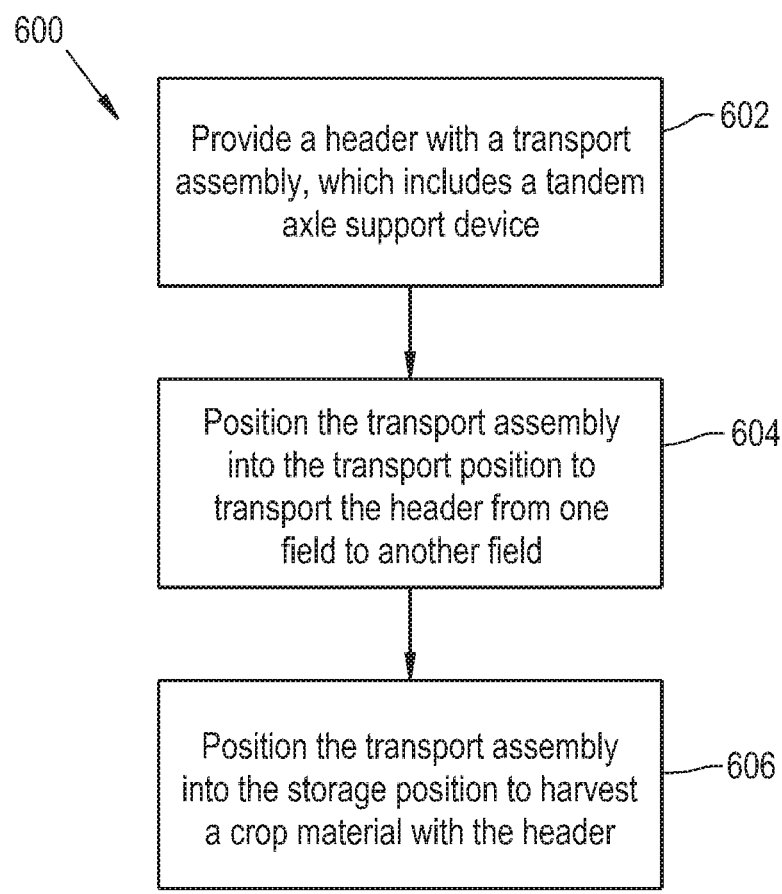
FIG. 6 illustrates a flowchart of a method for positioning the transport assembly of the header in the transport position and the storage position, in accordance with an exemplary embodiment of the present invention.

Referring now to FIG. 6, there is shown a flowchart of a method 600 for positioning the transport assembly 120 of the header 110 in the transport position and the storage position. As an initial step, the previously described transport assembly 120 can be provided (block 602). The transport assembly 120 can be positioned into the transport position in order to transport the header 110 from one field to another field (block 604). For example, positioning the transport assembly 120 into the transport position may include pivoting the pivot shaft(s) 126 from the storage position into the transport position by unfolding the pivot shaft(s) 126 relative to the frame 112. Furthermore, positioning the transport assembly 120 into the transport position may additionally include connecting the wheels 124 to the walking beams 128, 130, and detaching the connecting member(s) 106 of the agricultural vehicle 100 from the lift pocket(s) 114 of the frame 112.

For field-work, such as harvesting the crop material, the transport assembly 120 can be positioned into the storage position (block 606). For example, positioning the transport assembly 120 into the storage position may include attaching the connecting members 106 of the agricultural vehicle 100 to the lift pockets 114 of the frame 112. Furthermore, positioning the transport assembly 120 into the storage position may also include disconnecting the wheels 124 from the walking beams 128, 130 and connecting at least one wheel 124 of a respective pair of tandem wheels 124 to one lateral end 112A of the frame 112 and at least one wheel 124 of another respective pair of tandem wheels 124 to the other lateral end 112B of the frame 112. In this regard, these two wheels 124 may serve as gauge wheels for the header 110, contacting the field F and at least partially supporting the header 110, when the transport assembly 120 is in the storage position. Additionally, positioning the transport assembly 120 into the storage position may further include pivoting the pivot shaft(s) 126 from the transport position into the storage position by folding the pivot shaft(s) 126 underneath the frame 112. It should be appreciated that if the transverse shaft 132 is a telescoping transverse shaft 132, positioning the transport assembly 120 into the transport position or storage position may further include extending or retracting the telescoping transverse shaft 132. Additionally, if the transport assembly 120 includes a locking feature 500, positioning the transport assembly 120 may include locking the tandem axle support device 122 in the transport position and/or the storage position. An operator may perform the above method 600 to manually position the transport assembly 120 in the transport position and storage position.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A header for an agricultural vehicle, comprising:
a frame; and
a transport assembly connected to the frame and configured for being positioned in a transport position and a storage position, the transport assembly comprising:
a tandem axle support device comprising at least one pivot shaft pivotally connected to the frame, a first walking beam, and a second walking beam, the first and second walking beams are operably connected to and moveable by the at least one pivot shaft; and
at least four wheels comprising a first pair of tandem wheels removably connected to the first walking beam and a second pair of tandem wheels removably connected to the second walking beam,
wherein the at least one pivot shaft defines a longitudinal axis, the first walking beam defines a first longitudinal axis, and the second walking beam defines a second longitudinal axis, and
wherein when the at least one pivot shaft is folded relative to the frame, the first and second longitudinal axes of the first walking beam and the second walking beam are coplanar with the longitudinal axis of the at least one pivot shaft in the storage position.

2. The header of claim 1, wherein the at least one pivot shaft is folded underneath the header and parallel to a field in the storage position.

3. The header of claim 1, wherein the tandem axle support device further comprises a transverse shaft connected to the at least one pivot shaft, and the transverse shaft comprises a first end pivotally connected to the first walking beam and a second end pivotally connected to the second walking beam.

4. The header of claim 3, wherein the transverse shaft is in the form of a telescoping transverse shaft such that the telescoping transverse shaft is extended in the transport position and the telescoping transverse shaft is retracted in the storage position.

5. The header of claim 3, wherein the tandem axle support device further comprises at least one truss member removably interconnected between the frame and the transverse shaft.

6. The header of claim 5, wherein the at least one truss member comprises a pair of truss members.

7. The header of claim 1, wherein the at least four wheels are respectively connected to the first and second walking beams in the transport position, and the at least four wheels are disconnected from the first and second walking beams in the storage position.

8. An agricultural vehicle, comprising:
a chassis;
at least one connecting member; and
a header, comprising:
a frame removably attached to the at least one connecting member; and a transport assembly connected to the frame and configured for being positioned in a transport position and a storage position, the transport assembly comprising:
- a tandem axle support device comprising at least one pivot shaft pivotally connected to the frame, a first walking beam, and a second walking beam, the first and second walking beams are operably connected to and moveable by the at least one pivot shaft; and
- at least four wheels comprising a first pair of tandem wheels removably connected to the first walking beam and a second pair of tandem wheels removably connected to the second walking beam,
- wherein the at least one pivot shaft defines a longitudinal axis, the first walking beam defines a first longitudinal axis, and the second walking beam defines a second longitudinal axis, and
- wherein when the at least one pivot shaft is folded relative to the frame, the first and second longitudinal axes of the first walking beam and the second walking beam are coplanar with the longitudinal axis of the at least one pivot shaft in the storage position.

9. The agricultural vehicle of claim 8, wherein the frame of the header further comprises at least one lift pocket which receives the at least one connecting member, and the at least one lift pocket is positioned in between the first pair of tandem wheels.

10. The agricultural vehicle of claim 8, wherein the at least one pivot shaft is folded underneath the header and parallel to a field in the storage position.

11. The agricultural vehicle of claim 8, wherein the tandem axle support device further comprises a transverse shaft connected to the at least one pivot shaft, and the transverse shaft comprises a first end pivotally connected to the first walking beam and a second end pivotally connected to the second walking beam.

12. The agricultural vehicle of claim 11, wherein the transverse shaft is in the form of a telescoping transverse shaft such that the telescoping transverse shaft is extended in the transport position and the telescoping transverse shaft is retracted in the storage position.

13. The agricultural vehicle of claim 11, wherein the tandem axle support device further comprises at least one truss member removably interconnected between the frame and the transverse shaft.

14. The agricultural vehicle of claim 13, wherein the at least one truss member comprises a pair of truss members.

15. The agricultural vehicle of claim 8, wherein the at least four wheels are respectively connected to the first and second walking beams in the transport position, and the at least four wheels are disconnected from the first and second walking beams in the storage position.

16. A method for transporting a header comprising a frame and a transport assembly connected to the frame and configured for being positioned in a transport position and a storage position, the transport assembly comprising a tandem axle support device comprising at least one pivot shaft pivotally connected to the frame, a first walking beam, and a second walking beam, the first and second walking beams are operably connected to and moveable by the at least one pivot shaft, and at least four wheels comprising a first pair of tandem wheels removably connected to the first walking beam and a second pair of tandem wheels removably connected to the second walking beam, the method comprising:
- positioning the transport assembly into the transport position to transport the header from one field to another field;
- positioning the transport assembly into the storage position to harvest a crop material with the header;
- disconnecting the at least four wheels from the first walking beam and the second walking beam;
- connecting at least one wheel of the at least four wheels to a lateral end of the frame and connecting at least one wheel of the at least four wheels to another lateral end of the frame such that at least two of the at least four wheels are configured for serving as gauge wheels for the header; and
- pivoting the at least one pivot shaft from the transport position into the storage position.

17. The method of claim 16, wherein positioning the transport assembly into the transport position comprises:
- pivoting the at least one pivot shaft from the storage position into the transport position; and
- connecting the at least four wheels to the first walking beam and the second walking beam.

* * * * *